United States Patent [19]

Glasser et al.

[11] 4,436,546

[45] * Mar. 13, 1984

[54] FERTILIZER MATERIAL FROM APATITE

[75] Inventors: Fredrik P. Glasser, Bucksburn, Scotland; Richard P. Gunawardane, Kandy, Sri Lanka

[73] Assignee: National Research Development Corporation, London, England

[*] Notice: The portion of the term of this patent subsequent to Dec. 14, 1999 has been disclaimed.

[21] Appl. No.: 406,713

[22] Filed: Jul. 30, 1982

Related U.S. Application Data

[63]

Foreign Application Priority Data

Sep. 7, 1979 [GB] United Kingdom ................. 7931090

[51] Int. Cl.³ .............................................. C05B 13/00
[52] U.S. Cl. .......................................... 71/36; 71/45; 71/47; 71/51; 71/53
[58] Field of Search .................... 71/34, 36, 42, 45, 47, 71/51, 53, 64.03, DIG. 3; 423/167, 299, 312

[56] References Cited

U.S. PATENT DOCUMENTS

| | | | |
|---|---|---|---|
| 1,799,882 | 4/1931 | Brenek | 71/45 |
| 2,916,372 | 12/1959 | Schytil | 71/64.03 |
| 3,552,944 | 1/1971 | Hauschild et al. | 71/45 X |
| 4,106,922 | 8/1978 | Hauschild et al. | 71/DIG. 3 |

*Primary Examiner*—Ferris H. Lander
*Attorney, Agent, or Firm*—Oblon, Fisher, Spivak, McClelland & Maier

[57] ABSTRACT

Apatite is conventionally made into a fertilizer material by treatment with a strong acid, requiring capital-intensive industry. Hydroxyapatite is treated above 1100° C. with alkali but world reserves are problematic. The invention treats apatite at 900° C. with sodium aluminosilicate/carbonate and siliceous material in quantities to keep the composition in terms of CaO, $SiO_2$, $Na_2O$ and $P_2O_5$ in or near the ternary system $Ca_2SiO_4$—$Ca_3(PO_4)_2$—$CaNaPO_4$.

6 Claims, 1 Drawing Figure

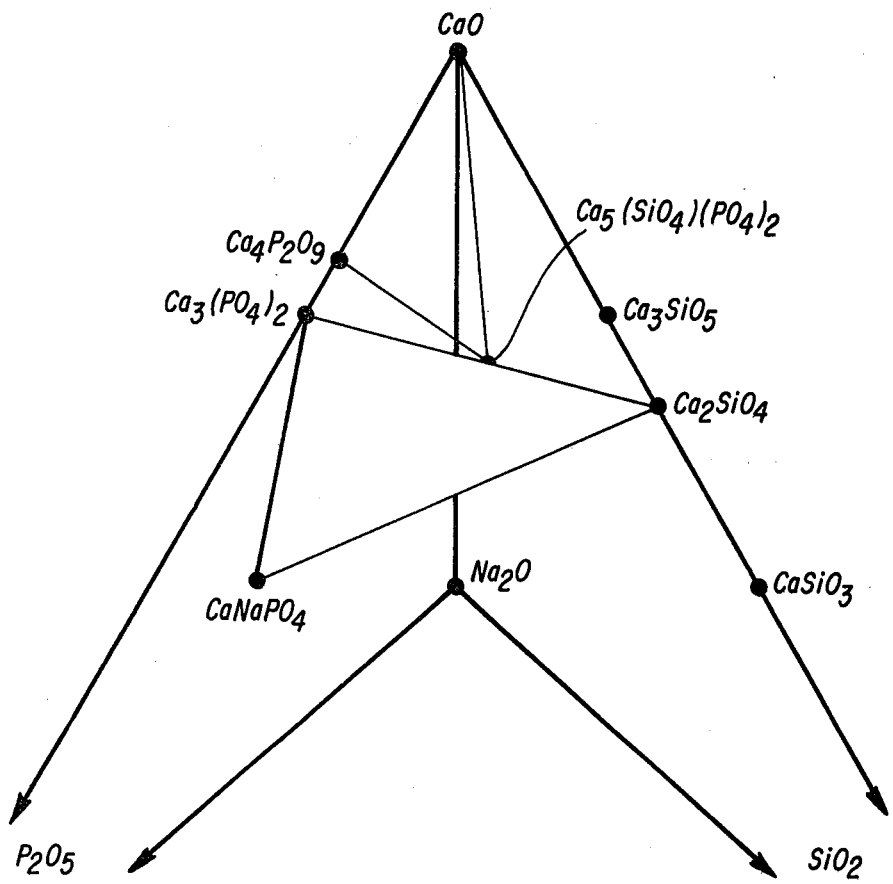

FERTILIZER MATERIAL FROM APATITE

This is a continuation, of application Ser. No. 261,162, filed Apr. 30, 1981, now U.S. Pat. No. 4,363,650, issued Dec. 14, 1982.

This invention relates to making a fertilizer material from apatite. Apatite is an insoluble phosphorus-containing mineral, approximating to $Ca_5(PO_4)_3(F,OH,Cl,\frac{1}{2}CO_3)$, and the phosphate content must be rendered soluble for fertilizer use.

Apatite, the most abundant terrestial form of phosphorus, is conventionally treated with a strong acid such as nitric or sulphuric acid to render the phosphate soluble. This requires a capital-intentive industry.

Another known way of treating apatite is the 'Rhenania process' described in British Patent Specification No. 301022. The apatite is mixed with $Na_2CO_3$ to give a molar ratio of $Na_2CO_3/P_2O_5 \simeq 1.0$, while at the same time sufficient $SiO_2$ is also added to combine with excess CaO. The reactants are ground together and calcined in a rotary kiln at 1100 C.–1200 C. for approximately 2 hours. Fluorine is said to be retained in the process, although steam is sometimes admitted to the kiln before 1000 C. is reached in an attempt to remove at least part of the fluorine. The sintered product may be used directly as a slow-release source of P or it may be subsequently extracted with hot aqueous $Na_2CO_3$ solution, giving either $Na_3PO_4$ or $Ca_3(PO_4)_2$. This process requires high temperatures, and hydroxy-rich apatite, which is indigenous to central Europe and occurs in a few other regions of the world, some of which are of questionable reliability.

Hard mineral apatite (richer in chlorine/fluorine) is widely available in Sri Lanka, India and East Africa and is often a by-product from other mining operations. The present invention seeks to make fertilizer material from such apatite at a lower temperature than the 1100 C.–1200 C. required in the Rhenania process and without using acid. Sri Lanka is understood to have an indigenous alkali (NaOH) industry. (While it does also produce hydrochloric acid, this is not a suitable acid for treating apatite.) The alkali is readily convertible to sodium carbonate. To make fertilizer material from apatite according to the present invention requires siliceous material, and this is also widely available as quartz, sand or potash felspar (an alkali metal aluminosilicate). Addition of the last-named in small proportions also has the advantage of introducing available $K_2O$, and the same might be said of mica.

Accordingly, the present invention is a method of making a fertilizer material from apatite, by roasting apatite at up to 1100 C. with a carbonate and/or aluminosilicate of an alkali metal in an amount such that the molar ratio apatite (as $P_2O_5$):alkali metal is 1:at least 3 and in the presence of sufficient siliceous material to keep the free-lime content of the fertilizer material below 2 weight % and to inhibit formation of tetracalcium phosphate.

The molar ratio apatite:alkali metal is preferably from 1:3 to 1:10, more preferably 1:3 to 1:5, for example 1:4.

The molar ratio apatite:siliceous material (as $SiO_2$) is preferably from 1:0.75 to 1:1.0.

The roasting temperature is preferably below 1000 C., and desirably at least 800 C., more preferably at least 850 C., most preferably from 880 C. to 950 C., for example 900 C. The duration of roasting need not exceed 2 hours, and is preferably at least 1 hour.

Preferably the apatite, the siliceous material and the carbonate and/or aluminosilicate are pressed together (e.g. pelletised) before the roasting. This appears to enhance the rate of reaction.

The invention extends to the fertilizer material made as set forth above, optionally admixed with other agriculturally acceptable components.

The reasons for avoiding excessive free lime and tetracalcium phosphate (i.e. why siliceous material is added) are as follows: Free lime is capable of causing skin burns, reacts with moisture thereby causing caking and may make the fertilizer, and hence the soil, too alkaline. The phosphate in tetracalcium phosphate $Ca_4P_2O_9$ is all soluble, i.e. it is at first sight an ideal fertilizer material. However, $Ca_4P_2O_9$ is liable to conversion in the presence of water vapour, which is likely in a fossil-fuel-fired tunnel kiln, to CaO (or $Ca(OH)_2$) plus insoluble hydroxyapatite, one of the very materials which the present invention was devised to solubilise.

In practice, the quantities of $Na_2O/K_2O$ and $SiO_2$ (which must be added in order to eliminate the above undesirable phases) are desirably the minimum, as an excess would result in too much dilution of the phosphate phases. A way of determining these is to consider the CaO— and $P_2O_5$-rich regions of the system $CaO—Na_2O—P_2O_5—SiO_2$. The plane of compositions lying between $Ca_2SiO_4$, $Ca_3(PO_4)_2$ and $CaNaPO_4$ just fulfils the condition that CaO and $Ca_4P_2O_9$ should be absent and, furthermore, we find that this plane of compositions constitutes a true ternary system at subsolidus temperatures. Its position within the quaternary system is shown in the accompanying drawing.

Table 1 records the results of solubility determinations made on pure single-phase preparations. For present purposes availability is defined by the relation:

$$\% \text{ available } P_2O_5 = 100 \times \frac{2\%\text{-citric-acid-soluble } P_2O_5}{\text{total } P_2O_5}$$

The experimental method for determining the 2%-citric-acid-soluble $P_2O_5$ is given in the Appendix. Ground mineral apatite is poorly soluble: typically only 17–18% of its $P_2O_5$ content is 'available'.

Amongst the phases having 100% available $P_2O_5$ are $Ca_4P_2O_9$, nagelschmidtite, silicocarnotite, rhenanite (a range of solid solutions around $CaNaPO_4$), and an $\alpha$ $Ca_2SiO_4$ solid solution containing typically 30 wt % $Ca_3(PO_4)_2$. The presence of silica in solid solution in rhenanite appears to activate the dissolution of phosphate. Moreover, phase A is not completely soluble unless it too contains silica in solid solution; Phase A is explained in the footnote to Table 3. Both $\alpha$ and $\beta$ $Ca_3(PO_4)_2$ give less than 100% available $P_2O_5$. Moreover, while $Ca_4P_2O_9$ has 100% availability, it is (as already mentioned) readily converted to hydroxyapatite by annealing in air, whereby the available $P_2O_5$ falls to 20%. Attempts to form a solid solution, substituting two $Na^+$ ions for $Ca^{++}$ ions, in the hope that $Ca_{4-x}Na_{2x}P_2O_9$ would be less reactive to water vapour than the $Ca_4P_2O_9$, were unavailing.

$CaNa_6P_2O_9$ was found to be 100% extractable, but is hygroscopic and therefore undesirable.

TABLE 1
RESULTS OF SOLUBILITY STUDIES

| SAMPLE | $P_2O_5$ SOLUBLE IN 2% CITRIC ACID | SOLUBILITY AS PERCENT OF TOTAL $P_2O_5$ |
|---|---|---|
| $\beta Ca_3(PO_4)_2$ | 34.0 | 74 |
| $\alpha Ca_3(PO_4)_2$ | 36.6 | 80 |
| $Ca_4P_2O_9$ | 38.9 | 100 |
| $Ca_4P_2O_9$ heated at 1000° C. in air | 7.8 | 20 |
| $Ca_5(SiO_4)(PO_4)_2$ | 30.1 | 100 |
| $Ca_7(SiO_4)_2(PO_4)_2$ | 21.9 | 100 |
| $\alpha$-$Ca_2SiO_4$ ss containing $Ca_3(PO_4)_2$ [Composition = 70.0 wt % $Ca_2SiO_4$] | 14.0 | 100 |
| Phase A - $Ca_5Na_2(PO_4)_4$ | 40.1 | 90 |
| Phase A ss containing $SiO_2$ [Composition = 20 wt % $Ca_2SiO_4$, 40% $Ca_3(PO_4)_2$, 40% $CaNaPO_4$] | 36.4 | 100 |
| $\beta CaNaPO_4$ | 45.0 | 100 |
| $\alpha CaNaPO_4$ ss containing $SiO_2$ [Composition = 10 wt % $Ca_2SiO_4$, 10% $Ca_3(PO_4)_2$, 80% $CaNaPO_4$] | 40.5 | 100 |
| $CaNa_6P_2O_9$ | 36.9 | 100 |
| Sri Lanka Apatite Sample (1) | 6.3 | 17 |
| Sri Lanka Apatite Sample (2) | 6.2 | 18 |

Note: ss = solid solution; Sri Lanka apatite sample (1) is a sample of pure apatite from the "leached zone" in the deposit at Eppawela, Sri Lanka. Sample (2) is a commercially beneficiated sample of apatite from Eppawela, Sri Lanka. For explanation of Phase A, see footnote to Table 3.

As for the influence of halogens, chlorine is almost entirely eliminated during the firing of apatite-containing batches, although most of the fluorine is retained. The fluorine is believed to be present in solid solution in phases which are soluble in citric acid. When these phases are dissolved in citric acid, fluorine is probably present in the solution in the form of fluorosilicate complexes.

The invention will now be described by way of example. The accompanying drawing shows a corner of the quaternary system $CaO$—$Na_2O$—$P_2O_5$—$SiO_2$. The plane $Ca_3(PO_4)_2$—$Ca_2SiO_4$—$CaNaPO_4$ has been marked out. Compositions on this plane contain neither CaO nor $Ca_4P_2O_9$, and accordingly are desirable.

Mineral apatite (minus 100 mesh BS) was reacted with $Na_2CO_3$ and $SiO_2$ (quartz, minus 120 mesh). The apatite was taken from the "leached zone" of the deposit: Table 2 gives a complete analysis typical of the concentrate as well as partial analysis of the particular batch of apatite concentrate used in this study. Microscopically, the apatite occurs as anhedral grains, most of which are monocrystals.

TABLE 2
CHEMICAL COMPOSITION OF SRI LANKA APATITE

| wt % | Sample EP/N/J from the leached zone[a] | Sample used in the Examples |
|---|---|---|
| CaO | 55.30 | — |
| SrO | 1.18 | — |
| MgO | 0.01 | — |
| MnO | 0.01 | — |
| $Fe_2O_3$ | 0.08 | — |
| $SiO_2$ | 0.40 | — |
| $P_2O_5$ | 40.75 | 38.10 |
| F | 1.78 | 1.70 |
| Cl | 2.29 | 2.20 |

[a] Analysis reported by the Geological Survey Department, Colombo 2, Sri Lanka (1973). The two samples were believed to be essentially identical.

Reaction batches were prepared by blending these raw materials and firing following a heating rate of 5 C./min at a constant temperature for 2 hours. Table 3 records the results of the annealing treatments. The phases present were determined by X-ray powder diffraction but the limit of detection of unreacted apatite was as high as 5%.

In the absence of $SiO_2$, mixtures of apatite and $Na_2CO_3$ react to produce large amounts of free CaO. Therefore, as free CaO is deemed to be an undesirable constituent, it is essential to add something to combine with it: $SiO_2$ fulfils this role.

Much of the reaction is completed swiftly, even though this apatite is comparatively coarse-grained. As a rough guide, batches having a molar ratio of apatite to $Na_2CO_3$ from 1:1.5 to 1:2.0 (i.e. apatite:alkali metal=- from 1:3 to 1:4) gave the most rapid reaction at low temperatures. These batch proportions correspond to a weight percentage of $Na_2CO_3$ between 20 and 27%. Some excess sodium carbonate was tolerable. If the optimum proportions of all three components are considered, molar ratios of apatite:$Na_2CO_3$:$SiO_2$ close to 1:2:1 are favourable for reaction. If the $SiO_2$ content is reduced slightly below this optimum, for example to 1:2:¾, a high yield of available phosphorus is obtained, but free CaO is also developed. Similarly, reduction of the sodium carbonate content leads to incomplete reaction and the appearance of unreacted apatite which can only be removed by sintering at 1100°–1300° C.

Table 3 shows the various compositions tried. Examples 1 to 3 are according to the invention. Examples A to K are not according to the invention Example 1 is shown prior to Example K. It will be seen that few of Examples A to K gave any significant reaction below 1100° C., and of those which did, either inadequate phosphate was solubilised (as H) or free lime and sometimes a hygroscopic product resulted (as C and D). The phases present are given roughly in the order: most first.

TABLE 3

| | COMPOSITION | | | | | 2% CITRIC ACID SOLUBILITY | | PHASES PRESENT |
|---|---|---|---|---|---|---|---|---|
| | Molar ratio | Weight percent | | | TEMP. | Wt Percent | Percent out of | (See abbreviations |
| Example No | Apatite:$Na_2CO_3$:$SiO_2$ | Apatite | $Na_2CO_3$ | $SiO_2$ | °C. | $P_2O_5$ | Total $P_2O_5$ | below) |
| A | 1:1:0 | 82.9 | 17.1 | 0.0 | 1100 | 20.5 | 55 | $\beta$ R + CaO + F ap |
| | | | | | 1300 | 28.5 | 76 | $\beta$ R + $\alpha\alpha$R + CaO + F ap |
| B | 2:3:0 | 76.3 | 23.7 | 0.0 | 900 | 23.0 | 67 | $\beta$ R + $\alpha$R + CaO + F ap |
| | | | | | 1100 | 27.8 | 81 | $\beta$ R + $\alpha$R + CaO + F ap |
| | | | | | 1300 | 29.5 | 86 | $\beta$ R + $\alpha$R + CaO + F ap |
| C | 1:2:0 | 71.0 | 29.0 | 0.0 | 900 | 31.4 | 90 | $\beta$ R + $CaNa_6P_2O_9$ + CaO + tr. F ap |
| | | | | | 1100 | 35.0 | 100 | $\beta$ R + CaO |
| | | | | | 1300 | 34.7 | 100 | $\beta$ R + CaO |

TABLE 3-continued

| Example No | COMPOSITION Molar ratio Apatite:Na$_2$CO$_3$:SiO$_2$ | Weight percent Apatite | Na$_2$CO$_3$ | SiO$_2$ | TEMP. °C. | 2% CITRIC ACID SOLUBILITY Wt Percent P$_2$O$_5$ | Percent out of Total P$_2$O$_5$ | PHASES PRESENT (See abbreviations below) |
|---|---|---|---|---|---|---|---|---|
| D | 1:10:0 | 32.9 | 67.1 | 0.0 | 900 | 16.6 | 100 | CaO + CaNa$_6$P$_2$O$_9$ |
| E | 5:2:8 | 78.6 | 6.5 | 14.9 | 1100 | 8.0 | 23 | F ap + αR + βR |
|   |       |      |     |      | 1300 | 14.4 | 42 | F ap + A |
| F | 4:2:3 | 85.1 | 8.1 | 6.8 | 1100 | 9.8 | 27 | F ap + αR + βR |
|   |       |      |     |      | 1300 | 15.8 | 43 | F ap + A |
| G | 10:8:3 | 82.9 | 14.2 | 2.9 | 1100 | 18.1 | 49 | β R + F ap + CaO |
|   |        |      |      |     | 1300 | 18.8 | 51 | β R + F ap + CaO |
| H | 13:10:11 | 79.4 | 12.7 | 7.9 | 900 | 10.0 | 36 | F ap + βR |
|   |          |      |      |     | 1100 | 16.5 | 59 | β R + F ap |
|   |          |      |      |     | 1300 | 20.4 | 73 | A + βC$_3$P + F ap |
| J | 1:1:1 | 75.5 | 15.6 | 8.9 | 1100 | 18.8 | 55 | β R + F ap |
|   |       |      |      |     | 1300 | 25.1 | 74 | A + βR + F ap |
| 1 | 4:6:3 | 71.5 | 22.2 | 6.3 | 900 | 21.7 | 67 | β R + αR + F ap |
|   |       |      |      |     | 1100 | 29.7 | 91 | β R + αR + F ap |
|   |       |      |      |     | 1300 | 30.0 | 92 | β R + αR + F ap |
| K | 2:3:3 | 67.3 | 20.9 | 11.8 | 1100 | 21.8 | 70 | β R + F ap |
|   |       |      |      |      | 1300 | 24.9 | 80 | β R + F ap |
| 2 | 4:8:3 | 66.6 | 27.5 | 5.9 | 900 | 27.0 | 92 | α R + βR + CaO + tr. F ap |
|   |       |      |      |     | 1100 | 30.4 | 100 | β R + αR + CaO |
|   |       |      |      |     | 1300 | 31.1 | 100 | β R + αR + CaO |
| 3 | 1:2:1 | 65.3 | 27.0 | 7.7 | 900 | 25.5 | 91 | αR + βR + tr. F ap |
|   |       |      |      |     | 1100 | 28.1 | 100 | αR |
|   |       |      |      |     | 1300 | 28.6 | 100 | αR |

Abbreviations: R = Rhenanite, CaNaPO$_4$; F ap = Fluorapatite, Ca$_5$(PO$_4$)$_3$F (all remaining apatite having this composition); tr. = trace. α and β are the high and low temperature forms respectively.
C$_3$P = tricalcium phosphate. Phase A is believed to approximate to Ca$_5$Na$_2$(PO$_4$)$_4$ and is the crystalline phase defined by Ando and Matsuno (J. Ando and S. Matsuno, Bull. Chem. Soc. Japan 41 (1968) 342.) In the present context, Phase A solid solutions may also contain silicon.

APPENDIX

Determining the 2%-citric-acid-soluble P$_2$O$_5$ in a sample:

The sample is ground to pass a 100 mesh BS sieve. A 1.0 g sample is extracted with 100 ml of 2% citric acid in a mechanical shaker operating at 260 oscillations per minute for 30 minutes at 18 C. The resultant solution is filtered under vacuum using a sintered glass crucible (porosity No. 4) and the filtrate P$_2$O$_5$ content is determined by the vanadomolybdate method, in which the following reagents are used:

(i) Ammonium metavanadate solution, prepared by dissolving 1.12 g of ammonium metavanadate in a mixture of 240 ml of concentrated HClO$_4$ acid and 260 ml of water.
(ii) Ammonium molybdate solution, prepared by dissolving 35 g of ammonium molybdate in 500 ml of water.
(iii) Standard phosphate solution, 0.2 mg/ml P$_2$O$_5$, prepared by dissolving 0.3835 g of dried potassium dihydrogen phosphate in 1 liter of water.

Solutions (i) and (ii) are stable and will keep for some months.

To a 2 ml aliquot of sample filtrate are added 10 ml of the vanadate solution (i) and 10 ml of the molybdate solution (ii) successively, mixing well after the addition of each reagent. The resultant solution is diluted with water in a 100 ml volumetric flask.

After 30 minutes the absorbance is measured at 460 nm using a Unicam SP 600 colorimeter against a reagent blank solution. The standard phosphate solution (iii) is used in calibration.

We claim:

1. A method of making a fertilizer material from hard mineral apatite rich in chlorine and/or fluorine, by roasting apatite at from about 880° C. to about 950° C. as a final temperature with a carbonate and/or aluminosilicate of an alkali metal in an amount such that the molar ratio of apatite (as P$_2$O$_5$):alkali metal:siliceous material (as SiO$_2$) is 1:at least 3:(0.75–1.0) whereby there is ensured the presence of sufficient siliceous material to keep the free-lime content of the fertilizer material below 2 weight % and to inhibit formation of tetracalcium phosphate.

2. The method according to claim 1, wherein the molar ratio apatite:alkali metal is from 1:3 to 1:10.

3. The method according to claim 2, wherein the molar ratio apatite:alkali metal is from 1:3 to 1:5.

4. The method according to claim 1, wherein the duration of the roasting does not exceed 2 hours.

5. The method according to claim 1, wherein the duration of the roasting is at least 1 hour.

6. The method according to claim 1, further comprising pressing together the apatite, the siliceous material and the carbonate and/or aluminosilicate before the roasting.

* * * * *

UNITED STATES PATENT AND TRADEMARK OFFICE
CERTIFICATE OF CORRECTION

PATENT NO. : 4,436,546

DATED : March 13, 1984

INVENTOR(S) : Fredrik P. Glasser et al

It is certified that error appears in the above-identified patent and that said Letters Patent is hereby corrected as shown below:

Related U. S. Application Data should read

--[63] Continuation of Ser. No. 261,162, Apr. 30, 1981, U.S. Patent No. 4,363,650, Dec. 14, 1982 --.

Signed and Sealed this

Twenty-second Day of May 1984

[SEAL]

*Attest:*

*Attesting Officer*

GERALD J. MOSSINGHOFF

*Commissioner of Patents and Trademarks*